United States Patent [19]

Sasaki et al.

[11] Patent Number: 4,920,937
[45] Date of Patent: May 1, 1990

[54] DIRECT FUEL INJECTION TYPE SPARK IGNITION INTERNAL COMBUSTION ENGINE HAVING A SQUISH FLOW FOR ASSISTING FUEL EVAPORATION

[75] Inventors: Shizuo Sasaki; Yoshiyuki Tamaki, both of Susono, Japan

[73] Assignee: Toyota Jidosha Kabushiki Kaisha, Aichi, Japan

[21] Appl. No.: 307,480

[22] Filed: Feb. 8, 1989

[30] Foreign Application Priority Data

Feb. 26, 1988 [JP] Japan .................. 63-42133

[51] Int. Cl.⁵ .............................. F02B 23/10
[52] U.S. Cl. .................. 123/305; 123/260; 123/276; 123/298; 123/302; 123/661
[58] Field of Search ............... 123/276, 279, 260, 261, 123/298, 302, 305, 661

[56] References Cited

U.S. PATENT DOCUMENTS

| | | | |
|---|---|---|---|
| 2,121,813 | 6/1938 | Mitchell | 123/261 |
| 2,779,320 | 1/1957 | Göschel et al. | 123/298 |
| 3,498,276 | 3/1970 | Hardenberg | 123/276 |
| 4,811,708 | 3/1989 | Gruden | 123/661 |

FOREIGN PATENT DOCUMENTS

| | | |
|---|---|---|
| 55-59136 | 4/1980 | Japan . |
| 55-97129 | 7/1980 | Japan . |
| 56-92717 | 7/1981 | Japan . |
| 58-142326 | 9/1983 | Japan . |
| 61-173728 | 10/1986 | Japan . |
| 62-82222 | 4/1987 | Japan . |
| 63-117150 | 5/1988 | Japan . |

*Primary Examiner*—Andrew M. Dolinar
*Attorney, Agent, or Firm*—Oliff & Berridge

[57] ABSTRACT

In a direct fuel injection type spark ignition internal combustion engine, fuel is assisted in evaporation by a squish flow. The engine includes a squish portion for generating the squish flow, a spark plug located adjacent to a center of a cylinder, and a fuel injector. The squish portion is enlarged so as to closely oppose the spark plug at the opening end of the squish portion. The fuel injector is located at a closed end of the squish portion and injects at least one portion of the fuel onto either one of two squish portion defining surfaces defining the squish portion therebetween. Evaporation of the fuel injected onto and adhering to the squish portion defining surface is promoted by the squish flow before being ignited by the spark plug.

15 Claims, 6 Drawing Sheets

DIRECT FUEL INJECTION TYPE SPARK IGNITION INTERNAL COMBUSTION ENGINE HAVING A SQUISH FLOW FOR ASSISTING FUEL EVAPORATION

BACKGROUND OF THE INVENTION

1. Field of the Invention

The present invention relates to a direct fuel injection type spark ignition internal combustion engine assisted in fuel evaporation by a squish flow.

2. Description of the Related Art

Direct fuel injection type spark ignition internal combustion engines are known, for example, in Japanese Patent Publication SHO 62-82222 and Japanese Utility Model Publication SHO 61-173728. In these engines, fuel is directly injected into a cylinder onto a surface of a piston. The fuel adhering to the surface of the piston is then evaporated by heat at the surface being assisted in fuel evaporation by a swirl, and then the evaporated fuel is ignited by a spark plug.

Further, though they are not a direct fuel injection type spark ignition engine, Japanese Utility Model Publication SHO 55-59136 and SHO 56-92717 disclose a squish portion for generating a squish flow, enlarged up to a position adjacent to a spark plug. The squish flow results from compression of the air and fuel between a piston and a cylinder head during movement of the piston toward the top dead center to force the air and fuel to flow toward the center of the cylinder. The publication SHO 55-59136 also discloses a groove formed at a squish portion defining surface. Further, Japanese Utility Model Publication SHO 58-142326 discloses a plug pocket portion, formed in a piston, for receiving a lower end portion of a spark plug therein when the piston is moved near a top dead center.

However, the above-described engines have some problems described below.

(a) Fuel evaporation at a surface needs an air flow to promote the evaporation. To generate such a flow in a cylinder, the direct fuel injection type engines use a swirl port, for example, a helical port. As a result, volumetric efficiency of the engine decreases at high engine speed operation due to flow resistance.

(b) Because flow speed of the swirl is comparatively slow, the flame propagation speed in a cylinder is slow. Therefore, especially in a high engine load operation where a fuel begins to be injected at an early time and thus the evaporated fuel is scattered to nearly all portions in the cylinder before it is ignited, the slow flame propagation makes inhibits the burning of an entire amount of the broadly scattered evaporated fuel. This decreases the engine power as well as increases a hydrocarbon amount in the exhaust gas. Further, especially in a low engine load operation where fuel is injected at a late time and thus there exists only a very short period of time before the ignition, insufficient evaporation of fuel due to the slow swirl flow is likely to cause failure in ignition.

(c) For the purpose of obtaining stable ignition in a low engine load operation, a cavity for holding evaporated fuel therein has to be formed in a piston with the cavity having a small diameter and deep depth. A plug gap portion of a spark plug has to be extended into the cavity. This means that the length of a portion of the spark plug exposed to the combustion chamber is long and the life of the spark plug is shortened. Further, the deep cavity is accompanied by an increase in compression height of the piston and thus increases the weight of the piston.

(d) Though the publication SHO 55-59136 and SHO 56-92717 disclose enlarged squish portions, it is impossible to combine such enlarged squish portions with the above-described swirl assist engine, because the squish flow can not flow into the deep cavity and can not evaporate the fuel adhering to the surface of the cavity. In addition, the squish flow may blow out the flame core formed in the vicinity of the spark plug, because the squish flow is much stronger than a swirl flow.

SUMMARY OF THE INVENTION

An object of the present invention is to provide a direct fuel injection type spark ignition internal combustion engine which uses a squish flow in place of a swirl flow for promoting fuel evaporation at a surface of a piston or a cylinder head.

Another object of the present invention is to provide an engine where a swirl generating structure is eliminated from intake ports to thereby increase volumetric efficiency and engine power especially at high engine speed operation.

Another object of the present invention is to provide an engine where a high flame propagation speed is obtained in a high engine load operation and a stable ignition is obtained in a low engine load operation.

A further object of the present invention is to provide an engine where the length of a portion of a spark plug protruding into a combustion chamber is made as small as possible.

In accordance with the present invention, the above-described objects are attained by a direct fuel injection type spark ignition internal combustion engine including a cylinder, a piston reciprocally movable in the cylinder, and a cylinder head. In the engine, fuel is directly injected into the cylinder onto a surface of either one of the piston and the cylinder head. The fuel adhering to the surface is then evaporated by heat at the surface, the evaporation being assisted by an air flow generated in the cylinder. Then the evaporated fuel is ignited. The engine generally includes a squish portion, a fuel injector and a spark plug. The squish portion is defined between two squish portion defining surfaces including one portion of an upper surface of the piston and one portion of a lower surface of the cylinder head. The squish portion is located in one half cross-section of the cylinder. The squish portion generates a squish flow as the air flow for assisting fuel evaporation when the piston is moved near a top dead center. The squish portion has a closed end defined by one portion of an inside surface of the cylinder and an open end opening in a direction toward the center of the cylinder. The squish portion is enlarged in a direction toward the center of the cylinder so that a central portion of the open end of the squish portion is located close to the center of the cylinder. The fuel injector injecting a fuel into the cylinder is located adjacent to a central portion of the closed end of the squish portion. The fuel injector is directed so as to inject at least one portion of the fuel onto either one of the squish portion defining surfaces so that the fuel adhering to the one squish portion defining surface is assisted in evaporation by the squish flow. The spark plug is located close to the center of the cylinder so as to oppose the central portion of the open end of the squish portion. Thus, the spark plug can ignite the evaporated fuel blown toward the spark plug.

In accordance with the above-described engine, an air flow necessary to promote fuel evaporation is a squish flow. Because a squish flow is much stronger than a swirl flow, the squish flow can effectively assist the evaporation of the fuel adhering to the one squish portion defining surface, though the squish flow is only generating when the piston is moved near the top dead center and there exists only a very short period of time before the fuel is ignited.

Because there is no necessity to use a swirl generating intake port, high volumetric efficiency is assured to thereby increase the engine power especially in a high engine speed operation.

Because the speed of the squish flow is very high in comparison with a swirl flow, the squish flow increases the flame propagation speed and causes an entire amount of the evaporated fuel existing in the cylinder to be perfectly burned in a very short period of time. This has an advantage especially in a high engine load operation where one portion of the fuel is injected at a comparatively early time and the evaporated fuel is scattered to all portions in the cylinder. Further, because the squish flow including the evaporated fuel is blown against the spark plug, a layer of a rich mixed gas is formed adjacent the spark plug to greatly improve ignition characteristics especially in a low engine load operation. The layer of a rich mixed gas forms a flame core once it is ignited by the spark plug. The flame core is unlikely to be blown out when the squish flow is blown toward it.

Because the squish flow flows along the lower surface of the cylinder head, the spark plug is not required to protrude into the combustion chamber by a long length. This short protrusion of the spark plug improves the life of the spark plug as well as shortening the compression height of the piston.

BRIEF DESCRIPTION OF THE DRAWINGS

The above and other objects, features and advantages of the present invention will become apparent and more readily appreciated from the following detailed description of the preferred exemplary embodiments of the invention taken in conjunction with the accompanying drawings, in which.

DETAILED DESCRIPTION OF THE PREFERRED EMBODIMENTS

Figure 11:
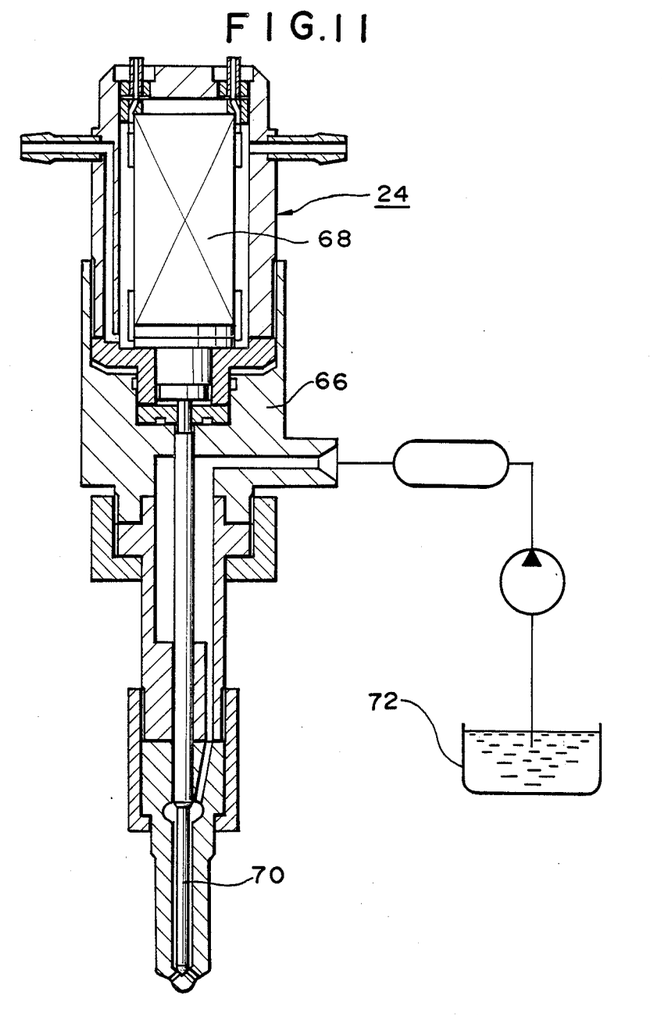
FIG. 11 is a cross-sectional view of a fuel injector capable of being mounted to engines in accordance with any embodiment of the present invention.
Figure 12:
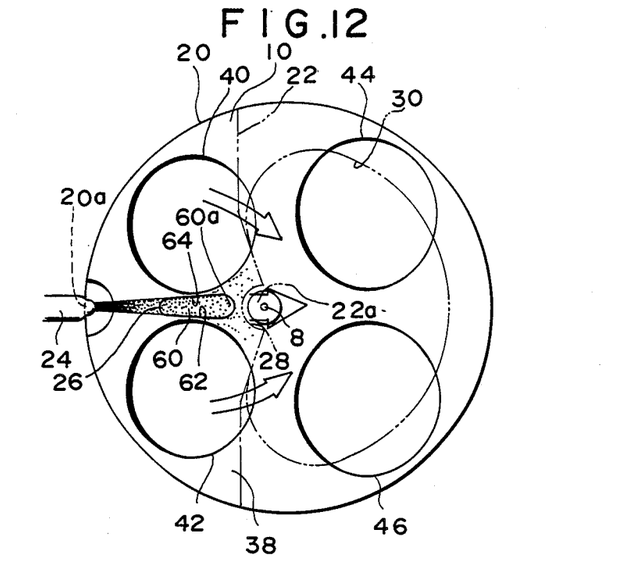
FIG. 12 is a plan view of a piston of a direct fuel injection type spark assist internal combustion engine in accordance with a second embodiment of the present invention.
Figure 13:
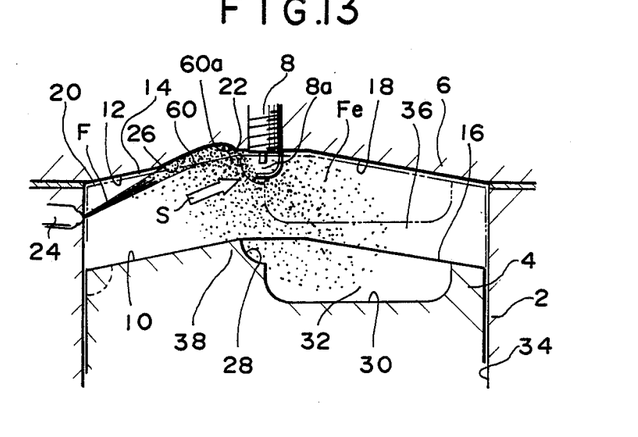
FIG. 13 is a cross-sectional view of a portion located in a vicinity of a combustion chamber, of the engine of FIG. 12.
Figure 14:
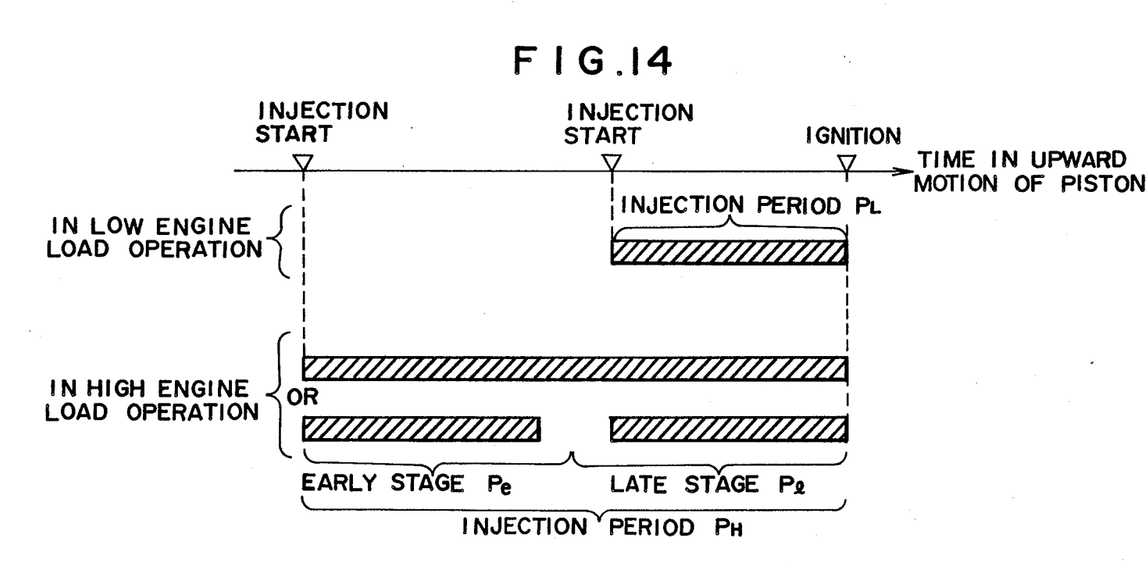
FIG. 14 is a diagram illustrating when fuels are injected in a low engine load operation and in a high engine load operation, which is applicable to engines in accordance with any embodiment of the present invention.

Two embodiments will be explained. FIGS. 1–10 illustrate a first embodiment where fuel is injected against a piston, and FIGS. 12 and 13 illustrate a second embodiment where fuel is injected against a cylinder head. FIGS. 11 and 14 are applicable to both embodiments. In the figures, portions common in structure with respect to both embodiments are denoted with the same reference numerals.

Firstly, common structures with respect to both embodiments and effects obtained by the structures will be explained in reference with, for example, FIGS. 1–10 and FIGS. 11 and 14.

Figure 1:
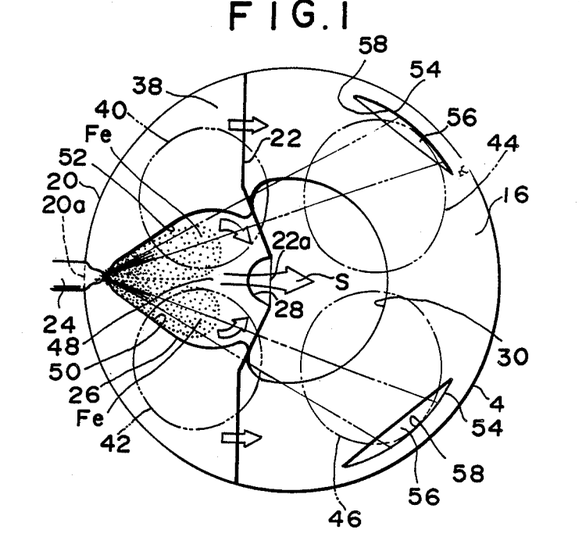
FIG. 1 is a plan view of a piston of a direct fuel injection type spark ignition internal combustion engine in accordance with a first embodiment of the present invention.
Figure 2:
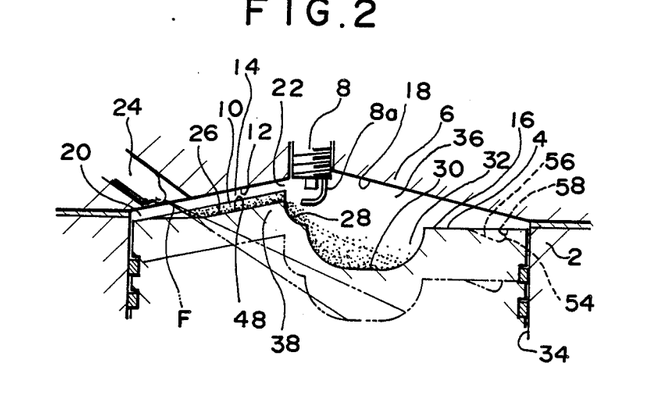
FIG. 2 is a cross-sectional view of a portion located in a vicinity of a combustion chamber, of the engine of FIG. 1.

As shown in FIGS. 1 and 2, a direct fuel injection type spark ignition internal combustion engine in accordance with the present invention includes a cylinder 2, a piston 4 reciprocally movable in cylinder 2, and a cylinder head 6. In the engine, fuel F is directly injected into a cylinder 2 onto a surface of either one of piston 4 and cylinder head 6. The fuel adhering to the surface is then evaporated by heat at the surface being assisted in evaporation by an air flow generated in cylinder 2. Then, the evaporated fuel Fe is ignited by a spark plug.

More particularly, the engine generally includes a squish portion 14, a spark plug 8, and a fuel injector 24. Squish portion 14 is a means for generating a squish flow S as the air flow for assisting the fuel evaporation when piston 4 is moved near a top dead center. Squish portion 14 is defined between two squish portion defining surfaces 10 and 12 which include one portion of an upper surface 16 of piston 4 and one portion of a lower surface 18 of cylinder head 6. Squish portion 14 is located in one half cross-section of cylinder 2. Squish portion 14 has a closed end 20 defined by one portion of an inside surface 34 of cylinder 2 and an open end 22 opening in a direction toward an inside of cylinder 2. Squish portion 14 is enlarged in the direction toward the inside of cylinder 2 so that a central portion 22a of open end 22 of squish portion 14 is located close to a center of cylinder 2. Fuel injection 24 for injecting a fuel into cylinder 2 is located adjacent to a central portion 20a of closed end 20 of squish portion 14. Fuel injector 24 is directed so as to inject at least one portion of the fuel F injected at at least a late time onto either one of squish portion defining surfaces 10 and 12 so that the fuel adhering to the one squish portion defining surface 10 or 12 is assisted in evaporation by the squish flow S. Evaporated fuel Fe included in the squish flow S is blown to a lower end portion 8a of the spark plug 8 which includes an ignition gap of spark plug 8. Spark plug 8 is located close to the center of cylinder 2 so as to oppose central portion 22a of open end 22 of squish portion 14. The length of a portion of spark plug 8 protruded into a combustion chamber is shorter than that in the case of the conventional direct fuel injection type engine.

Because squish portion 14 generates the air flow for promoting fuel evaporation, there is no necessity to construct at least one of intake ports 40 and 42 (see FIG. 10) in the form of a swirl generating port. This decreases flow resistance of intake ports 40 and 42 and improves volumetric efficiency of the engine. Thus, the engine power is improved especially at high engine speed operation. The squish flow S helps a flame propagate at high speeds in a direction of the squish flow S from spark plug 8 to a main space of a combustion chamber 36. This enables a prompt and perfect combustion of the evaporated fuel Fe existing in the main space of combustion chamber 36 to thereby improve the engine power especially in a high engine load operation.

With reference to FIG. 14 and FIGS. 3–8, the fuel F injected at a late stage P1 of a fuel injection period $P_H$ in a high engine load operation or at an entire stage of a fuel injection period $P_L$ in a low load engine operation flows onto one of the squish portion defining surfaces 10 and 12. The fuel adhering to the surface is then evaporated in a very short period of time being assisted in evaporation by the squish flow S. Then, the evaporated fuel Fe is blown toward spark plug 8 to form a layer of a rich mixed gas around spark plug 8. This layer of a rich mixed gas assures a stable ignition, and once it has been ignited by spark plug 8, it forms a flame core which is unlikely to be blown out when it receives the squish flow S. The stable ignition has an advantage especially in a low engine load operation as compared with the conventional direct fuel injection type engine where it is difficult to obtain a stable ignition in a low engine load operation due to the insufficient fuel evaporation owing to the weak swirl flow. In addition, because the squish flow S flows along squish portion defining surface 12, that is, one portion of lower surface 18 of cylinder head 6, the length of a portion of spark plug 8 protruded into the combustion chamber can be short. This improves the life of spark plug 8. Further, due to the arrangement that the spark plug 8 is located close to the center of cylinder 2, spark plug 8 is prevented from interfering with intake ports 40 and 42 and exhaust ports 44 and 46 (see FIG. 10). In addition, the flame propagation distance is short to thereby improve the combustion. Due to the enlarged structure of squish portion 14, the squish flow S is strengthened and the evaporated fuel Fe is easily guided so as to flow in a direction toward spark plug 8.

As shown in FIGS. 1 and 2, one of the squish portion defining surfaces 10 and 12, onto which the fuel F is injected, includes a recessed groove 26 beginning at a position or positions where the fuel F collides with the one squish portion defining surface 10 or 12 and extending in a direction toward central portion 22a of open end 22 of squish portion 14. The one squish portion defining surface 10 or 12 includes a surface of groove 26. Due to the recessed structure of groove 26, a flow flowing from squish portion 14 into groove 26 is generated when piston 4 is moved near the top dead center. This flow suppresses the evaporated fuel Fe generated at the surface of groove 26 in flowing out of groove 26.

As shown in FIGS. 1 and 2, a center line of the one squish portion defining surface 10 or 12 onto which the fuel F is injected, a center line of groove 26, a lower end portion of the fuel injector 24, and an axis of spark plug 8 are located in a single plane including an axis of piston 4. Due to this arrangement, fuel injector 24 can inject the fuel F substantially in the same direction as the direction of the squish flow S generated in squish portion 14. This enables the evaporated fuel Fe to flow in the direction toward the inside of cylinder 2, more particularly, in the direction toward spark plug 8 being guided by groove 26.

As shown in FIG. 11, fuel injector 24 preferably comprises a multihole injector. Fuel injector 24 injects the fuel from a fuel tank 72 through the multihole (two of which are shown in a lowermost portion of the fuel injector 24 in FIG. 11) into cylinder 2 when an actuator 68 preferably comprising a piezo-type actuator operates a needle valve 70 to open the multiholes. An amount of the fuel to be injected is controlled through controlling an opening period of time of the multiholes corresponding to output signals from an engine control computer (not shown) to which signals, such as an engine speed signal and an engine load signal, are input. As shown in FIG. 14, in a high engine load operation, the fuel F begins to be injected at an early time and thus the injection period $P_H$ is long, though the fuel F may be injected intermittently in the period $P_H$. In FIG. 14, a continuous injection and an intermittent injection in the period H are shown. On the contrary, in a low engine load operation, the fuel F begins to be injected at a late time and the fuel injection period $P_L$ is short.

As shown in FIGS. 1 and 2, piston 4 includes a plug pocket portion 28 capable of receiving a lower end portion 8a of spark plug 8 therein when piston 4 is moved near the top dead center. Plug pocket portion 28 prevents piston 4 from interfering with lower end portion 8a of spark plug 8. Plug pocket portion 28 further operates to cause the evaporated fuel Fe to stagnate in plug pocket portion 28 to thereby make the evaporated fuel Fe more stably ignited by spark plug 8.

As shown in FIGS. 1 and 2, piston 4 includes a recessed concave portion 30 defining a cavity 32 with a comparatively large volume therein on a downstream side of plug pocket portion 28 in the direction of the squish flow S generated in squish portion 14. A contour of concave portion 30 in a direction perpendicular to the axis of piston 4 is substantially a semi-circle that is formed by cutting a circle having a center on the axis of piston 4 with a line offset from the axis of piston 4 on the side closer to fuel injector 24. Plug pocket portion 28 opens to cavity 32 at a side surface of concave portion 30. A bottom surface of concave portion 30 is a lowermost portion of upper surface 16 of piston 4. The surface of concave portion 30 operates so as to evaporate the fuel F when the fuel F is injected onto the surface of concave portion 30 at a comparatively early stage Pe (see FIG. 14) of the injection period $P_H$ (see FIG. 14) in a high engine load operation. Though the fuel evaporation at the surface of concave portion 30 is practically not assisted by the squish flow S, the fuel F can be perfectly evaporated, because there exists a comparatively long period of time before piston 4 is moved near the top dead center and the evaporated fuel Fe is ignited by spark plug 8.

Figure 9:
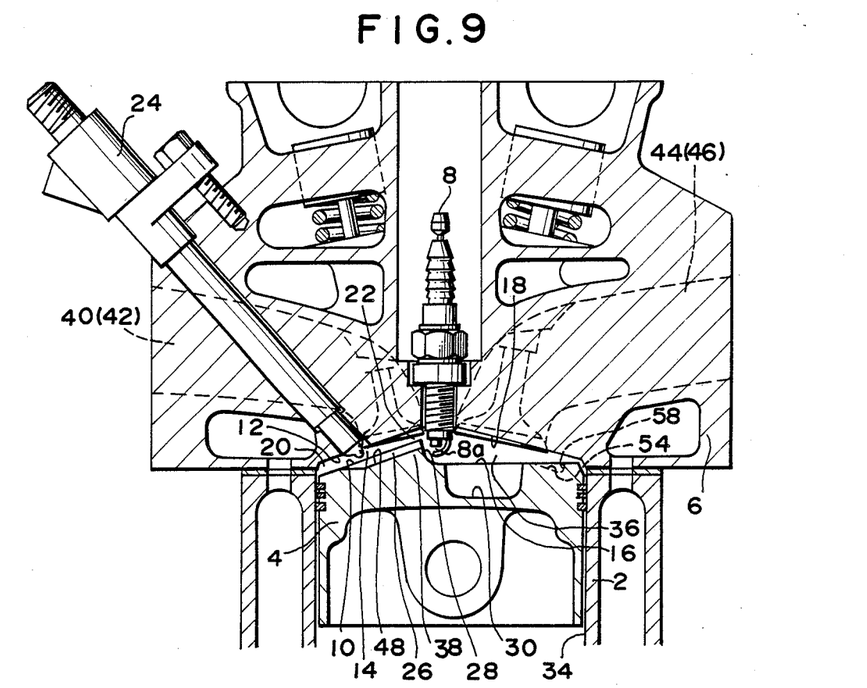
FIG. 9 is a cross-sectional view of an upper portion of the engine in accordance with the first embodiment.

As shown in FIG. 9, lower surface 18 of cylinder head 6, upper surface 16 of piston 4 and inside surface 34 of cylinder 2 define combustion chamber 36 therein. Combustion chamber 36 includes the cavity 32 formed in concave portion 30 of piston 4, a space formed in plug pocket portion 28 of piston 4, and the squish portion 14 including a space formed in groove 26. Lower surface 18 of cylinder head 6 is recessed and is substantially conical. Piston 4 has a convex portion 38 at its top portion on one side of the axis of piston 4, more particularly, on the side closer to fuel injector 24. An upper surface of convex portion 38 extends substantially parallel to the conical lower surface 18 of cylinder head 6 to define one of the squish portion defining surfaces 10 and 12. The conical structure of lower surface 18 of cylinder head 6 helps the intake gas to be smoothly introduced in a direction toward cavity 32 and to be smoothly exhausted from cavity 32. Convex portion 38 of piston 4 accomodates the small protrusion of spark plug 8 into combustion chamber 36.

Figure 10:
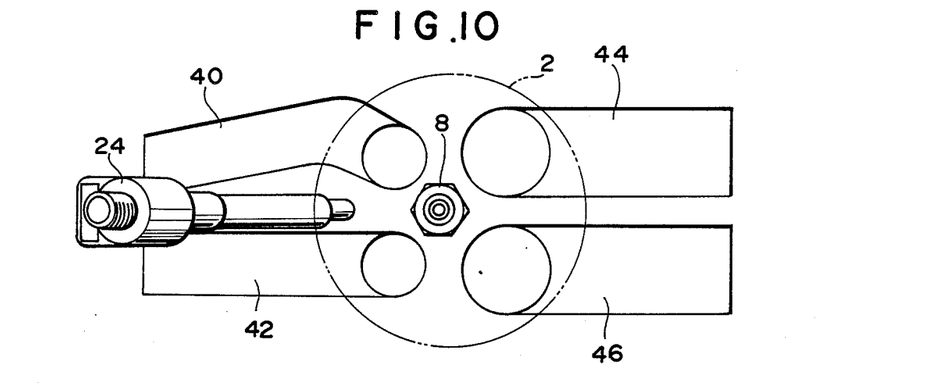
FIG. 10 is a schematic plan view of port portions, a fuel injector and a spark plug of the engine of FIG. 9.

As shown in FIG. 10, the engine includes two intake ports 40 and 42 and two exhaust ports 44 and 46. Spark plug 8 is located at a position surrounded by these ports 40, 42, 44 and 46. Spark plug 8 extends substantially parallel to the axis of cylinder 2. Fuel injector 24 is located between intake ports 40 and 42 in a plan view of the engine. Exhaust ports 44 and 46 extend straight in the plan view of the engine. These arrangements of the ports, spark plug 8 and fuel injector 24 make the engine compact and make flow resistance in exhaust ports 44 and 46 small.

Next, structures specific to each embodiment will be explained.

With respect to the first embodiment, as shown in FIGS. 1 and 2, fuel injector 24 is directed so as to inject fuel in a direction toward piston 4. Groove 26 is formed in piston 4. Groove 26 has a groove bottom surface 48 and groove side surfaces 50 and 52. Groove 26 opens to plug pocket portion 28 through a space defined above groove bottom surface 48 and between groove side surfaces 50 and 52. A distance between groove side surfaces 50 and 52 in a direction perpendicular to the center line of groove 26 is decreased in the vicinity of the open end of groove 26, so that when the squish flow S is generated in groove 26, the evaporated fuel Fe having been evaporated in groove 26 flows out of groove 26 in the direction toward spark plug 8 and is guided by groove side surfaces 50 and 52.

As shown in FIGS. 1 and 2, piston 4 includes a recessed notched portion 54 at positions where a portion of the fuel injected from fuel injector 24 at a very early stage of the fuel injection period $P_H$ (see FIG. 14) in a high engine load operation collides with piston 4. Notched portion 54 has a bottom surface 56 gradually increasing in depth in a direction away from the center of piston 4 and an erecting surface 58 extending from a deep side end of bottom surface 56 of notched portion 54 up to a flat upper surface portion of piston 4 at a steep inclination angle. Erecting surface 58 prevents the fuel F injected onto and adhering to bottom surface 56 of notched portion 54 from flowing further toward and adhering to inside surface 34 of cylinder 2. Too much adhering of fuel onto inside surface 34 of cylinder 2 will cause a non-perfect combustion of fuel as well as a momentary sticking of piston 4 to cylinder 2.

As shown in FIGS. 1, 2 and 14, groove 26, concave portion 30 and notched portion 54 are arranged in the order of groove 26, concave portion 30 and notched portion 54 in a direction away from fuel injector 24 so that when a fuel is injected from fuel injector 24 from an early time such as in a high engine load operation, one portion of the fuel injected at a very early stage of the fuel injection period collides with piston 4 at notched portion 54 when the piston is away from the top dead center, another portion of the fuel injected at a comparatively early and intermediate stage Pe of the fuel injection period $P_H$ collides with piston 4 at concave portion 30 when the piston is moving toward the top dead center, and the remaining portion of the fuel injected at a comparatively late stage Pl of the fuel injection period $P_H$ collides with piston 8 at groove 26 when the piston is near the top dead center. In a low engine operation, an almost all of the fuel injected from fuel injector 24 collides with piston 4 at groove 26, because the fuel begins to be injected at a late time.

With respect to the second embodiment, as shown in FIGS. 12 and 13, fuel injector 24 is directed so as to inject fuel in a direction toward cylinder head 6. In the engine, fuel injector 24 is fixed to cylinder 2. Groove 26 is formed in cylinder head 6 between ends of intake ports 40 and 42. Groove 26 begins at a position where the fuel F injected from fuel injector 24 collides with lower surface 18 of cylinder head 6, extends in a direction toward spark plug 8, and ends at a position adjacent to spark plug 8. Groove 26 has a groove bottom surface 60 and groove side surfaces 62 and 64. An end portion 60a, closer to spark plug 8, of groove bottom surface 60 is smoothly curved. A tangent of the curved end portion 60a of groove bottom surface 60 is directed so as to pass through concave portion 30 of piston 4 without interfering with the ignition gap of spark plug 8 when piston 4 is moved near the top dead center. Side surfaces 62 and 64 extend substantially in parallel with each other. Because of this groove structure, when piston 4 is at a low position and a squish flow is not generated strongly, the fuel F injected onto groove bottom surface 60 flows along groove bottom surface 60 in a liquid state and further flows into concave portion 30 of piston 4 being guided curved end portion 60a without interfering with spark plug 8. Once the squish flow F has been generated, the squish flow S evaporates the fuel F and the evaporated fuel Fe is blown against the ignition gap of spark plug 8.

Next, operation of the direct fuel injection type engine will be explained.

Firstly, operation of the engine in accordance with the first embodiment will be explained.

Figure 3:
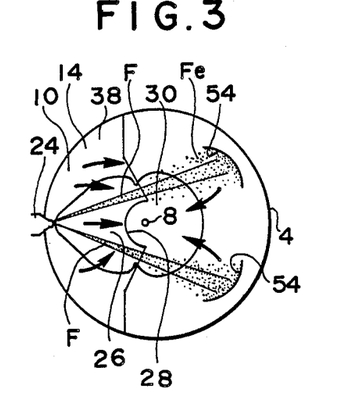
FIG. 3 is a plan view of a portion located in the vicinity of the combustion chamber, of the engine of FIG. 1, illustrating a state thereof at a very early stage of a fuel injection.
Figure 4:
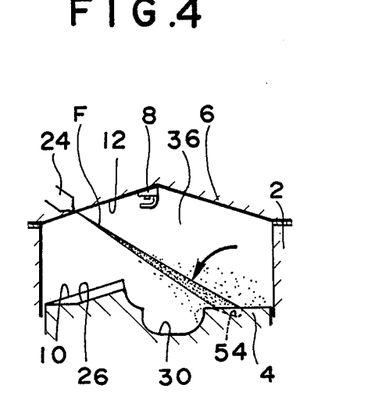
FIG. 4 is a cross-sectional view of the portion of FIG. 3.

As shown in FIGS. 3, 4 and 14, when fuel is injected at a very early time, more particularly, at a very early stage of the fuel injection period $P_H$ in a high engine load operation, the fuel F flows in a direction toward notched portion 54. Because of the long flowing distance, one portion of the flowing fuel F loses its flowing inertia and will float in combustion chamber 36. The remaining portion of the flowing fuel F flows up to notched portion 54 and adheres onto the surface of notched portion 54 where the fuel F is evaporated.

Figure 5:
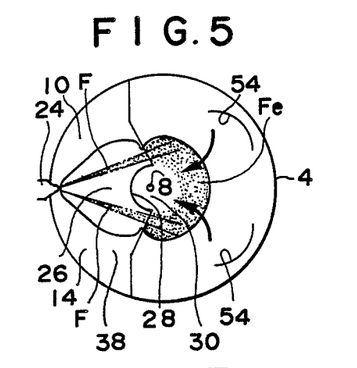
FIG. 5 is a plan view of the portion located in the vicinity of the combustion chamber, of the engine of FIG. 1, illustrating a state thereof at a comparatively early or middle stage of the fuel injection.
Figure 6:
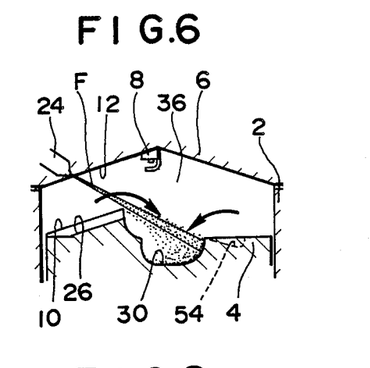
FIG. 6 is a cross-sectional view of the portion of FIG. 5.

As shown in FIGS. 5, 6 and 14, when fuel is injected at a comparatively early time, more particularly, at a comparatively early stage Pe of the fuel injection period $P_H$ in a high engine load operation, the fuel F flows in a direction toward concave portion 30 and adheres to the surface of concave portion 30, where the fuel is evaporated to form a mixed gas in cavity 32. The fuel F adhering to the surface can be perfectly evaporated because there exists a comparatively long period of time before piston 4 reaches a position near to the top dead center and the evaporated fuel Fe is ignited by spark plug 8.

Figure 7:
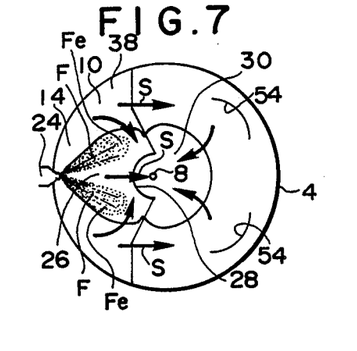
FIG. 7 is a plan view of a portion located in the vicinity of the combustion chamber, of the engine of FIG. 1, illustrating a state thereof at a late stage of the fuel injection.
Figure 8:
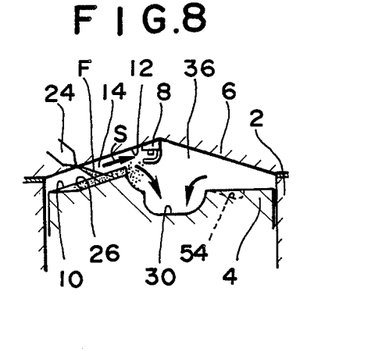
FIG. 8 is a cross-sectional view of the portion of FIG. 7.

As shown in FIGS. 7, 8 and 14, when fuel is injected at a late time, more particularly, at a late stage P1 of the fuel injection period $P_H$ in a high engine load operation or at at an entire stage of the fuel injection period $P_L$ in a low engine load operation, the fuel F flows in a direction toward squish portion defining surface 10, where the fuel F is evaporated. The evaporated fuel Fe is blown to spark plug 8 together with the squish flow S. Though there exists a very short period of time before piston 4 reaches a position close to the top dead center and the evaporated fuel Fe is ignited, the fuel F adhering to squish portion defining surface 10 is perfectly evaporated because the strong squish flow S effectively promotes the fuel evaporation. One portion of the evaporated fuel Fe blown to spark plug 8 forms a layer of rich mixed gas in the vicinity of spark plug 8 and the remaining portion of the evaporated fuel Fe flows into cavity 32 formed in concave portion 30. The layer of rich mixed gas assures a stable ignition. The layer of rich mixed gas further forms a flame core once it is ignited. The flame core is unlikely to be blown out though it receives the squish flow S. The flame propagates quickly to the evaporated fuel Fe floating in cavity 32 and is promoted in propagation by the squish flow S to perfectly burn the entire amount of the fuel existing in cylinder 2 in a very short period of time.

With respect to the second embodiment, as shown in FIGS. 12, 13 and 14, the fuel F is injected onto lower surface 18 of cylinder head 6.

When fuel is injected from fuel injector 24 at an early time, more particularly, at an early stage Pe of the fuel injection period $P_H$ in a high engine operation, the fuel F flows along groove bottom surface 60 of groove 26 almost without being evaporated because little squish flow is generated at that time. The liquid fuel F finally leaves groove 26 being guided by curved end surface 60a and flows toward concave portion 30 without touching the lower end portion of spark plug 8. The fuel F adhering to the surface of concave portion 30 is perfectly evaporated because there exists a considerably long period of time before piston 4 reaches a position near to the top dead center and the evaporated fuel Fe is ignited by spark plug 8.

When fuel is injected from fuel injector 24 at a late time, more particularly, at a late stage P1 of the fuel injection period $P_H$ in a high engine load operation or at an entire stage of the fuel injection period $P_L$ in a low engine load operation, almost all of the fuel F injected onto the surface of groove 26 is promoted in evaporation by the strong squish flow S generated at that time. The evaporated fuel Fe is blown to the ignition gap of spark plug 8 together with the squish flow S to form a layer of rich mixed gas to assure a stable ignition. Once ignited, the layer of rich mixed gas forms a flame core which is unlikely to be blown out by the squish flow S. Because of the squish flow S, the flame effectively propagates to the evaporated fuel Fe floating in cavity 32 to burn it in a very short period of time.

As will be apparent from the above description, the following various effects are obtained in accordance with the present invention.

Firstly, because of the enlarged squish portion 14, a swirl generating port is not required to be provided. This improves volumetric efficiency of the engine especially in a high engine speed operation.

Secondly, because of the squish flow S which is much stronger than a swirl flow, the flame can propagates at high speeds to enable perfect combustion of the fuel to thereby improve the engine power especially in a high engine load operation.

Thirdly, because of the fuel evaporation assisted by the squish flow S, a layer of rich mixed gas is formed in the vicinity of spark plug 8. This assures a stable ignition and has a great advantage especially in a low engine load operation.

Fourthly, because of the fuel evaporation assisted by the squish flow S, the length of a portion of spark plug 8 protruded into the combustion chamber is short. This improves the life of the spark plug 8.

Although only a few preferred embodiments of the present invention have been described in detail, it will be appreciated by those skilled in the art that various modifications and alterations can be made to the particular embodiments shown without materially departing from the novel techniques and advantages of the invention. Accordingly, it is to be understood that all such modifications and alterations are included in the scope and spirit of the invention as defined by the following claims.

What is claimed is:

1. A direct fuel injection type spark ignition internal combustion engine comprising:

a piston/cylinder structure including a cylinder, a piston reciprocally movable in the cylinder, and a cylinder head, wherein fuel is directly injected into the cylinder onto a surface of one of the piston and the cylinder head, the fuel adhering to the surface being evaporated at the surface by heat at the surface and being assisted in evaporation by an air flow generated in the cylinder, the evaporated fuel subsequently being ignited;

a squish portion defined between two squish portion defining surfaces that include one portion of an upper surface of the piston and one portion of a lower surface of the cylinder head and are located in one half cross-section of the cylinder, the squish portion generating a squish flow as the air flow in the cylinder for assisting fuel evaporation when the piston is moved near a top dead center, the squish portion having a closed end defined by one portion of an inside surface of the cylinder and an open end opening in a direction toward a center of the cylinder, the squish portion being enlarged in the direction toward the center of the cylinder so that a central portion of the open end of the squish portion is located adjacent to the center of the cylinder;

a fuel injector for injecting fuel located adjacent to a central portion of the closed end of the squish portion, the fuel injector being directed so as to inject at least one portion of the fuel onto one of the squish portion defining surfaces so that the fuel adhering to the one squish portion defining surface is assisted in evaporation by the squish flow; and a spark plug located adjacent to the center of the cylinder so as to oppose the central portion of the open end of the squish portion, the spark plug igniting the evaporated fuel blown toward the spark plug by the squish flow.

2. The engine according to claim 1, wherein the fuel is injected onto one of the squish portion defining surfaces, and that one squish portion defining surface includes a recessed groove beginning at a position where the fuel injected from the fuel injector collides with the one squish portion defining surface, the groove extending in a direction toward the central portion of the open end of the squish portion, a surface of the groove defining one portion of the one squish portion defining surface.

3. The engine according to claim 2, wherein a center line of the one squish portion defining surface, a center line of the groove, a lower end portion of the the fuel injector, and an axis of the spark plug are located in a single plane including an axis of the piston.

4. The engine according to claim 1, wherein the piston includes a plug pocket portion for receiving a lower end portion of the spark plug therein when the piston is moved near the top dead center.

5. The engine according to claim 4, wherein the piston includes a recessed concave portion defining a cavity with a comparatively large volume therein on a downstream side of the plug pocket portion in a direction of the squish flow.

6. The engine according to claim 5, wherein the lower surface of the cylinder head, the upper surface of the piston, and the inside surface of the cylinder define a combustion chamber therein, the combustion chamber including the cavity formed in the concave portion of the piston, the plug pocket portion, and the squish portion including the groove.

7. The engine according to claim 6, wherein the lower surface of the cylinder head defining the combustion chamber therebelow is recessed and substantially conical, and the piston has a convex portion at its top portion on one side of an axis of the piston closer to the fuel injector, an upper surface of the convex portion extending substantially parallel to the conical lower surface of the cylinder head and defining one of the squish portion defining surfaces.

8. The engine according to claim 2, wherein the fuel injector is directed so as to inject fuel in a direction toward the piston, and the groove is formed in the piston.

9. The engine according to claim 8, wherein the groove has a groove bottom surface and groove side surfaces, the groove having an open end opening to a plug pocket portion formed in the piston in a direction toward an axis of the spark plug through a space defined above the groove bottom surface and between the groove side surfaces, a distance between the groove side surfaces in a direction perpendicular to a longitudinal center line of the groove decreasing in a vicinity of the open end of the groove so that when the squish flow is generated in the groove, the evaporated fuel flows out of the groove in a direction toward the spark plug and is guided by the groove side surfaces.

10. The engine according to claim 8, wherein the piston includes a recessed notched portion at each position where one portion of the fuel injected from the fuel injector collides with the piston at a very early stage of a fuel injection period in a high engine load operation, the notched portion having a bottom surface gradually increasing in depth in a direction away from a center of the piston and an erecting surface projecting from the bottom surface of the notched portion at an inclination angle.

11. The engine according to claim 10, wherein the groove, the concave portion and the notched portion are sequentially arranged in a direction away from the fuel injector in the order of the groove, the concave portion and the notched portion so that one portion of the fuel collides with the piston at the notched portion at the very early stage of the fuel injection in the high engine load operation, another portion of the fuel collides with the piston at the concave portion at a comparatively early and middle stage of the fuel injection in the high engine load operation, and the remaining portion of the fuel collides with the piston at the groove at a late stage of the fuel injection in the high engine load operation.

12. The engine according to claim 11, wherein all the fuel injection from the fuel injector collides with the piston at the groove during a fuel injection period in a low engine load operation.

13. The engine according to claim 2, wherein the fuel injector is directed so as to inject fuel in a direction toward the cylinder head, and the groove is formed in the cylinder head.

14. The engine according to claim 13, wherein the groove begins at a position where the fuel injected from the fuel injector collides with the cylinder head, extends in a direction toward the spark plug, and ends at a position spaced from and adjacent to the spark plug, the groove having a groove bottom surface and groove side surfaces, an end portion of the groove bottom surface closest to the spark plug being smoothly curved, and a tangent of the curved end portion of the groove bottom surface being directed so as to pass through the piston without intersecting a lower end portion of the spark plug when the piston is moved near the top dead center.

15. The engine according to claim 13, wherein the fuel injector is coupled to the cylinder and the groove is formed between intake ports formed in the cylinder head.

* * * * *